United States Patent Office 3,129,694
Patented Apr. 21, 1964

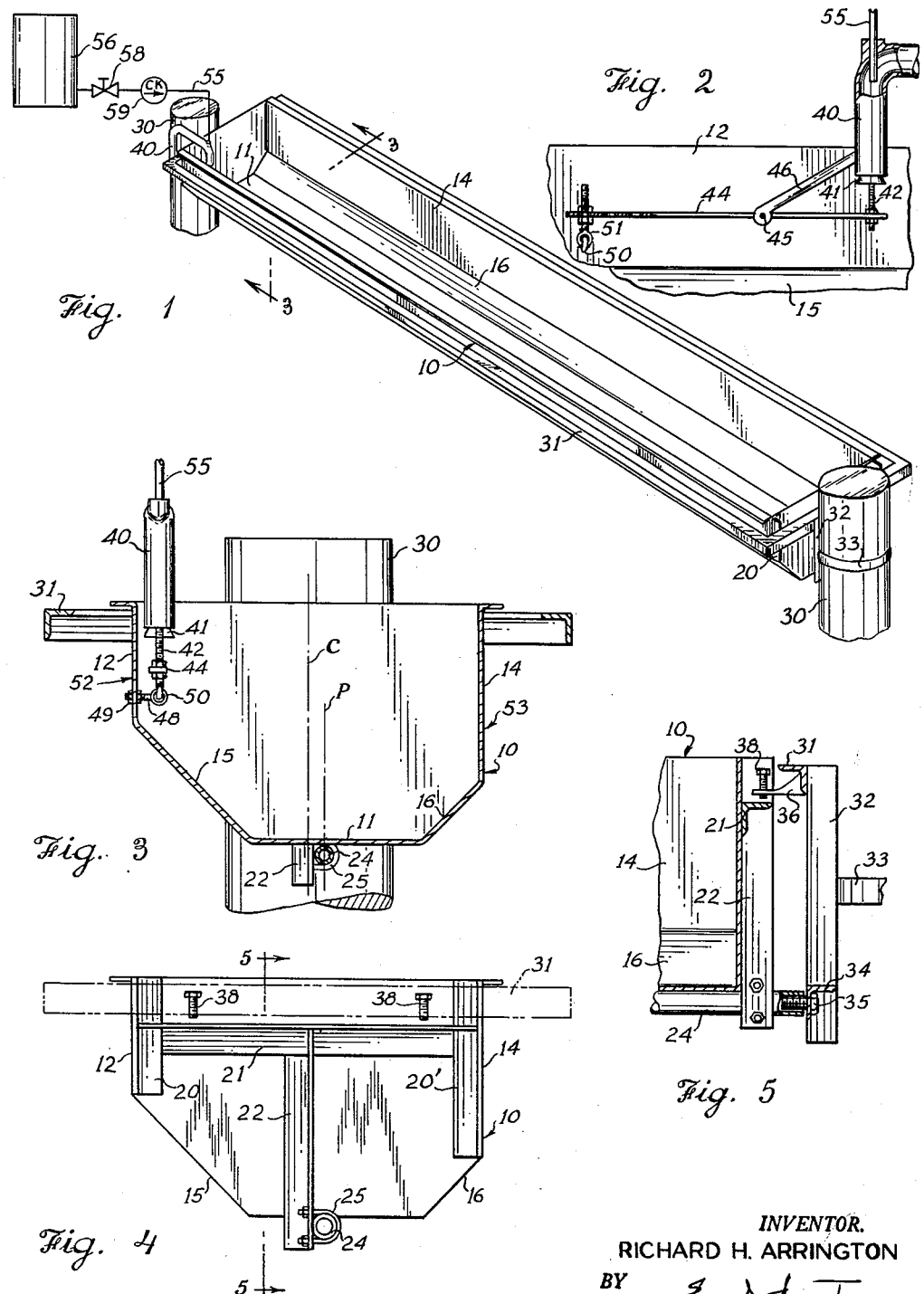
*Fig. 1* *Fig. 2* *Fig. 3* *Fig. 4* *Fig. 5*
INVENTOR.
RICHARD H. ARRINGTON
ATTORNEY

3,129,694
WATERING TROUGHS
Richard H. Arrington, 492 S. Court St.,
Montgomery 4, Ala.
Filed Dec. 1, 1960, Ser. No. 73,134
6 Claims. (Cl. 119—81)

This invention relates to watering troughs, and is more particularly concerned with a trough for cattle or other large animals, which trough will refill automatically upon depletion of the water therein.

Watering stock such as cattle is a decided problem in view of the opinions that a large number of diseases comes from contaminated water. In the past, automatic troughs have been operated by a float valve; and, since a float valve requires a large fluid level differential to actuate the valve to a full-open position, the troughs have necessarily been very large in order to supply water to the cattle before the troughs refill. Such a trough is undesirable in view of the lack of portability as well as the necessity for having large amounts of water in the open such that it can collect disease germs. Float valves have a tendency to clog, and any float will eventually become waterlogged, thus precluding further operation of the valve.

The weight of the water has been used to control the flow in numerous watering devices; however, these prior art devices use the weight of water to stop the flow, while a weight, spring or the like is required to start the flow. The present device, on the other hand, uses a shift in the center of gravity of the water both to stop and to start the flow of water.

The present invention provides a watering trough with a relatively small capacity. The water level is maintained at sufficient depth to allow livestock to drink, thus supplying fresh cool water at all times. This is achieved by providing a trough pivotally mounted so as to be unbalanced. The conformation of the trough is such that when the trough is filled, one side of the trough is heavier; when the water level is lower, the other side of the trough is heavier. A lever arrangement is attached to one side of the trough, and the tilting of the trough moves the lever to actuate the valve to stop or start the flow of water from the filler pipe. The valve actuating arrangement is adjustable so that the water level may be kept fairly constant, or may vary considerably.

It is an object of the present invention to provide a watering trough which will maintain a constant supply of fresh, cool water.

It is another object of the present invention to provide a watering trough which supplies a large volume of water without having a large amount of water lying idle to stagnate.

It is a further object of the present invention to provide an automatically refillable watering trough which will not become clogged or otherwise inoperable.

A further object of the present invention is to provide a watering trough in which additives may be mixed with the water in accurately controlled proportion.

Another object of the present invention is to provide an automatically refillable watering trough which is simple in construction, very efficient in operation, and well designed to meet the demands of economical manufacture.

Other and further objects, features and advantages of the present invention will become apparent from consideration of the following specification taken in conjunction with the accompanying drawings in which:

FIG. 1 is a perspective view of one preferred form of the present invention chosen for illustration.

FIG. 2 is a detail view of the valve operating arrangement drawn to an enlarged scale.

FIG. 3 is a cross sectional view taken on the line 3—3 of FIG. 1 and drawn to an enlarged scale.

FIG. 4 is an end elevational view of the trough removed from the support members and drawn to an enlarged scale.

FIG. 5 is a cross sectional view taken substantially along the line 5—5 of FIG. 4, and including the support means for the trough.

Referring now more particularly to the drawings and to that embodiment of the invention here chosen for purpose of illustration, it will be seen that the device comprises an elongate trough 10 substantially rectangular in the plan view. The trough 10 has a flat bottom portion 11 and two opposed substantially vertical side walls 12 and 14. An integrally formed slanted or side-bottom portion 15 joins side wall 12 to bottom portion 11; a slanted or side-bottom portion 16 joins side wall 14 to bottom portion 11. It will be noted that slanted portion 15 is substantially longer than slanted portion 16; therefore, the volume of liquid on the left (as seen in FIG. 3) of centerline C of trough 10 which is equidistant from side walls 12 and 14 will be less than the volume of liquid to the right of centerline C for all liquid levels.

To support the trough 10, each end of the trough is provided with an angle-iron structure best seen in FIG. 4. Vertical strengthening members 20 and 20' are attached along the vertical side walls 12 and 14 respectively. A horizontal piece 21 is welded between the members 20, 20'. A substantially centrally located member 22 is welded to the cross piece 21 and extends below the bottom 11. A pipe 24 extends the full length of the trough 10 and is held on each end thereof by a U-bolt 25 passing around the pipe 24 and attaching to the member 22. It will be observed in FIG. 3 that a vertical plane through the longitudinal axis of the pipe 24, which is indicated by the pivot line P, is slightly to the right of the vertical centerline C.

Supporting brackets for the trough 10 may be attached to any stationary object such as posts 30 in FIG. 1 as by straps 33. The supporting brackets are made up of a rectangular frame 31 having vertical members 32 depending therefrom on each end. A cross piece 34 joins the lower ends of members 32 and has threaded therethrough a bolt 35 which fits into the end of pipe 24 for pivotal support thereof. In addition to supporting the trough, the frame 31 prevents the livestock from hitting the trough 10.

Each end of frame 31 is provided with internally threaded protrusions 36 (FIG. 5) which receive screws 38. The screws 38 are disposed over the trough frame member 21 to limit the rotation of the trough.

Attention is now directed to FIG. 2 which shows the valve arrangement of the present invention. A filler pipe 40 bends over the edge and into the trough 10, and is fitted with a valve plug 41. Attached to the valve plug 41 is a threaded stud 42 which receives one end of a rod 44. The rod 44 is pivoted at 45 to arm 46, arm 46 being attached to filler pipe 40. The opposite end of rod 44 is held by stud 48, stud 48 being attached to the side of the trough 10, as at 49. A hook link at 50 allows relative movement between the hook 51 and the stud 48. Thus, it will be seen that, when the side 52 of the trough goes down, the lever 44 will be pivoted to move the valve plug 41 into the filler pipe 40 to stop the flow of water. When the side 53 of trough 10 goes down, the lever 44 will be pivoted to remove the valve plug 41 from the filler pipe 40 to allow water to flow. It will be realized that, when the trough 10 begins to shift, the water therein will shift, causing added weight to the descending side; therefore, the tilting of the trough will be accelerated, causing a very rapid opening or closing of the valve.

Due to the fact that the filler pipe is either completely off or full-on, the watering trough of the present invention is admirably suited as a means for giving animals many required substances by adding them to the drinking water. To provide for the mixing of additives with the water, an additive pipe 55 is inserted into the filler pipe 40 so that an aspirating action will take place. Referring to FIG. 1 of the drawings, it will be seen in schematic representation that there is provided a tank 56 to hold the supply of the additive. A valve 58 may be adjusted to add the proper amount of the substance to the water; and, a check valve 59 prevents contamination of the additive by water backing up into the additive pipe 55.

From the foregoing, the operation of the watering trough should be apparent. When the water level is low, the long wall 15 will cause the larger portion of the water to rest on the right hand side of the line of pivot P. The heavier side will move downward, causing side 52 to move upward, carrying with it stud 48, hence arm 44. The raising of the left end of arm 44 causes the right end of arm 44 to move downward, thereby removing valve plug 41 and allowing water to flow from filler pipe 40. As the trough fills, the center of gravity of the water shifts to lie on the opposite side of line of pivot P, thus causing the side 52 of trough 10 to move downward, carrying with it the stud 48 and arm 44. The lowering of the left end of arm 44 raises the right end of arm 44 and inserts valve plug 41 into filler pipe 40 to stop the flow of water.

If it be desired to put an additive into the water, the tank 56 is filled with the desired substance, and the valve 58 is adjusted to allow the desired amount of the substance to pass. When water flows through the filler pipe 40, the pressure normal to the line of flow is reduced, according to well known laws. The atmospheric pressure in the tank 56 will force the substance therein through the additive pipe 55 and into the stream of water, the additive thus becoming mixed throughout the water. With constant water pressure at the filler pipe 40, the amount of additive will remain constant.

It is therefore seen that the trough of my trough assembly acts much as a toggle switch. In my device the pivot of bolts 35 is below the center of gravity of the trough at all times, regardless of whether the trough 10 is filled with water or empty, and the trough 10 remains essentially upright. The shape and dimensions of the trough 10, however, are asymmetrical, such that a preponderance of water first fed to the trough 10 is accumulated on one side (to the right in FIG. 3) of the pivot, thus tilting the trough 10 to a valve opening position during the initial part of the cycle of filling the trough. As the water continues to fill the trough, the center of gravity gradually shifts transversely to the left until it passes over the pivot, at which time the trough tilts rapidly from the valve opening position to a valve closing position accompanied by a transfer of a substantial amount of water toward the left, thereby rapidly moving the center of gravity transversely further outwardly to the left. With the trough 10 in this position, the water may be removed from the trough by the animals, thereby gradually shifting the center of gravity transversely inwardly to the right until it again passes over the pivot, at which time the trough tilts to the valve opening position with a transfer of water to the right, shifting the center of gravity further outwardly to the right.

It will be understood that with the pivot above the center of gravity a very different action of the trough takes place with a gradual shifting or tilting of the trough and an accompanying gradual opening and closing of the valve.

It will thus be seen that the present invention provides a simple, efficient watering trough which is highly dependable. The large stream of water makes possible the use of a relatively small container which will provide fresh, cool water at all times. The constant rate of flow through the filler pipe makes possible the use of the pipe as an aspirating device for additives. Simple supporting means and relatively small size of the trough make the moving of the trough a simple matter.

While the embodiment here shown is of substantially rectangular configuration, it will be understood that many shapes may be used which would cause the shift of the center of gravity of the water. Therefore, it will be understood that many changes and modifications may be made, and the full use of equivalents resorted to without departing from the spirit or scope of the invention as outlined in the appended claims.

I claim:

1. A watering trough assembly comprising an elongated trough for supporting water, pivot means below said trough and supporting the same for pivotal movement about an axis parallel to the longitudinal axis of the trough, means for limiting the pivoting of said trough in directions generally perpendicular to the longitudinal axis of the trough such that said trough is maintained in substantially an upright position at all times, means for feeding water into said trough, means for arresting the flow of water to said trough from said means for feeding water, control means actuated by pivotal movement of said trough for controlling said means for arresting said flow of water, said trough being so dimensioned that the center of gravity of said trough shifts from one side to the other over said pivot means during the filling of said trough and shifts from said other side to said one side after a substantial amount of said water has been removed from said trough, and a vertically adjustable stop adjacent each side of the trough with one stop limiting tilting of the trough in one direction and the other stop limiting tilting of the trough in the opposite direction.

2. A watering trough assembly comprising a tiltable elongated generally U-shaped trough closed at both ends, pivot means connected to the ends of said trough about which said trough may tilt about an axis parallel to the longitudinal axis of the trough, said trough being so dimensioned that when it is in an essentially upright position and substantially filled with water, it is slightly tilted to one side of said pivot means and the center of gravity of said trough is on said one side of the pivot means of said trough, and when it is in an essentially upright position and only partially filled with water, it is slightly tilted to the other side of the pivot means and the center of gravity of said trough is on said other side of the pivot means of said trough, said pivot means being below at least one of the aforesaid centers of gravity of said trough for supporting said trough in said essenenally upright position and said slightly tilted positions, a filling spout for feeding water into said trough, a plug adapted to project into said spout, a lever pivotally mounted adjacent said trough, said plug being mounted on one end of said lever for movement thereby into and away from said spout, and a link at the other end of said lever and connected to a side of said trough for movement of said lever upon movement of said trough about said pivot means, said lever moving said plug away from said spout upon tilting of said trough to said other side and moving said plug toward said spout upon tilting of said trough to said one side.

3. In animal watering apparatus, an elongated trough, means to support said trough for pivotal movement about an axis beneath the bottom of the trough and parallel to the longitudinal axis of the trough, said pivotal axis being in a vertical plane offset from a vertical plane extending through the longitudinal centerline of the trough, means to supply water to said trough, a valve to control the flow of water to the trough, valve actuating means operable responsive to said pivotal movement of the trough in one direction to open the valve and operable upon pivotal movement in the other direction to close the valve, said trough being generally U-shaped with one side having a greater slope than the other side so that the center of gravity of the trough moves above and across the pivotal axis of the trough upon changes in the quantity of water therein, and a vertically adjustable stop adjacent each side of the trough to limit movement of the trough with said trough pivoting in response to the movement of the center of gravity across the pivotal axis of the trough between one stop when the trough contains a predetermined maximum quantity of water and the other stop when the trough contains a predetermined minimum quantity of water.

4. A watering trough assembly comprising a tiltable elongated generally U-shaped trough closed at both ends, pivot means connected to said trough adjacent its ends about which said trough may tilt about an axis parallel to the longitudinal axis of the trough, said trough being so dimensioned that when it is in an essentially upright position and substantially filled with water, it is slightly tilted to one side and the center of gravity of said trough is on said one side of said trough, and when it is in an essentially upright position and only partially filled with water, it is slightly tilted to the other side and the center of gravity of said trough is on said other side of said trough, said pivot means being below at least one of the aforesaid centers of gravity of said trough for supporting said trough in said essentially upright position and said slightly tilted positions, a filling spout for feeding water into said trough, a valve for controlling the flow of water from said filling spout into said trough, said valve including a plug adapted to project into said spout, a lever pivotally carried by said spout, said plug being mounted on one end of said lever for movement thereby into and away from said spout, a link at the other end of said lever and connected to a side of said trough for movement of said lever upon movement of said trough about said pivot means, and means limiting the tilting in both directions of said trough such that said trough is maintained in essentially its upright position, said means limiting the tilting of said trough including an adjustable stop adjacent each side of said trough with one stop limiting tilting of the trough to one side and the other stop limiting tilting of the trough to the other side, said lever moving said plug away from said spout upon tilting of said trough to said other side and moving said plug toward said spout upon tilting of said trough to said one side.

5. In a gravity actuated tilting water trough,
(a) a trough proper which is axially elongated and which in transverse section has a pair of generally vertical side walls, one of said side walls being longer than the other thereof,
(b) a sloping side-bottom wall joined at its upper edge to the lower edge of the shorter of said side walls,
(c) a bottom wall joined along one edge to the lower edge of said side-bottom wall,
(d) the opposite edge of the bottom wall being connected in water-tight fashion to the lower edge of the longer of said vertical walls, and
(e) means pivotally supporting the trough for tilting movement about a longitudinal axis, said means being located beneath the trough and at such transverse position relative thereto that when the trough is empty the trough tilts to a position to move the longer of said side walls downwardly, and when filled with a predetermined amount of water shifts to a position with the trough substantially horizontally disposed.

6. In a gravity actuated tilting water trough,
(a) a trough proper which is axially elongated and which in transverse section is five sided,
(b) there being two opposite generally vertical sides one of which is shorter than the other,
(c) a bottom for the trough,
(d) oppositely disposed inwardly sloping side-bottom walls one of which is longer than the other,
(e) the lower edge of the shorter of the vertical walls being connected to the upper edge of the longer of the side-bottom walls and the lower edge of the latter being connected to one edge of the bottom wall,
(f) the lower edge of the longer of the vertical walls being connected to the upper edge of the shorter of the side-bottom walls and the latter being connected to the opposite edge of the bottom wall, and
(g) means supporting the trough for pivoting about a longitudinal axis which is so located that due solely to the presence in the trough of a predetermined weight of water the trough remains substantially upright and upon the presence therein of a lesser predetermined weight of water the trough tilts toward the side in which is included the shorter of the bottom-side walls.

References Cited in the file of this patent

UNITED STATES PATENTS

| | | |
|---|---|---|
| 331,452 | Sears | Dec. 1, 1885 |
| 1,051,168 | Smith | Jan. 21, 1913 |
| 1,384,699 | Krull | July 12, 1921 |
| 1,567,944 | Guzmon | Dec. 29, 1925 |
| 2,219,616 | Bradshaw et al. | Oct. 29, 1940 |
| 2,325,242 | Gordon | July 27, 1943 |
| 2,671,464 | Mabbs | Mar. 9, 1954 |
| 2,966,885 | Bentley | Jan. 3, 1961 |

FOREIGN PATENTS

| | | |
|---|---|---|
| 193,688 | Great Britain | Mar. 1, 1923 |